United States Patent [19]

Okamoto et al.

[11] Patent Number: 4,857,589

[45] Date of Patent: Aug. 15, 1989

[54] HYDROLYZED ETHYLENE-VINYL ACETATE COPOLYMER

[75] Inventors: Shinji Okamoto, Kurashiki; Masaaki Minakawa, Hirakata; Youiti Neki; Masasi Nakagiri, both of Kurashiki, all of Japan

[73] Assignee: Nippon Gohsei Kagaku Kogyo Kabushiki Kaisha, Osaka, Japan

[21] Appl. No.: 73,722

[22] Filed: Jul. 15, 1987

[30] Foreign Application Priority Data

Jul. 16, 1986 [JP]  Japan ................................. 61-168580

[51] Int. Cl.$^4$ .............................................. C08F 8/12
[52] U.S. Cl. .................................... 525/60; 525/330.6
[58] Field of Search ............................. 525/60, 61, 62

[56] References Cited

U.S. PATENT DOCUMENTS 4,611,029  9/1986  Takahashi ........................... 525/61

*Primary Examiner*—Christopher A. Henderson
*Attorney, Agent, or Firm*—Antonelli, Terry & Wands

[57] ABSTRACT

A hydrolyzed ethylene-vinyl acetate copolymer having an ethylene content of 20 to 60% by mole and a defree of hydrolysis in the vinyl acetate component of at least 95% by mole, and having an ash content of not more than 20 ppm and an alkali metal content of not more than 5 ppm. The hydrolyzed copolymer of the invention can form films whose gas impermeability is not lowered even at high humidity.

3 Claims, No Drawings

HYDROLYZED ETHYLENE-VINYL ACETATE COPOLYMER

BACKGROUND OF THE INVENTION

The present invention relates to a hydrolyzed ethylene-vinyl acetate copolymer having an improved water resistance, and more particularly to a hydrolyzed ethylene-vinyl acetate copolymer having an excellent gas impermeability even under high humidity.

A hydrolyzed ethylene-vinyl acetate copolymer is excellent in an oxygen impermeability, a mechanical strength, and the like, and is useful for various uses such as films, sheets, containers and fibers. However, the hydrolyzed copolymer has defects that physical properties such as a flexibility of the molded articles therefrom are changed largely due to change of humidity and temperature of the outside, and a gas impermeability is particularly changed largely due to the change of temperature and it is lowered under high humidity, since the hydrolyzed copolymer has a high moisture absorption.

In order to solve the above defects, there have been proposed, for instance, (1) a method in which a film or sheet of a hydrolyzed ethylene-vinyl acetate copolymer is laminated with a water resistant resin such as a polyolefin to prevent a permeation of water-vapor from the outside, and (2) a method in which a crosslinkable group such as silyl group are introduced into a structure of the hydrolyzed ethylene-vinyl acetate copolymer to provide water resistance for the hydrolyzed copolymer, and the like.

However, in the laminating method (1), a laminating operation is required and even if laminating the film or sheet of the hydrolyzed copolymer with the water resistant resin, it is difficult to prevent the permeation of water-vapor from the edges of the film or sheet. On the other hand, in the method (2), the crosslinking or gelation of the hydrolyzed copolymer occurs easily upon the preparation or molding of the hydrolyzed copolymer, and the moldability is lowered.

An object of the present invention is to provide a hydrolyzed ethylene-vinyl acetate copolymer having an improved water resistance without the abovementioned defects.

This and other objects of the present invention will become apparent from the description hereafter.

SUMMARY OF THE INVENTION

In accordance with the present inventin, there is provided a hydrolyzed ethylene-vinyl acetate copolymer having an ethylene content of 20 to 60% by mole and a degree of hydrolysis in the vinyl acetate component of at least 95% by mole, and having an ash content of not more than 20 ppm and an alkali metal content of not more than 5 ppm.

DETAILED DESCRIPTION

The feature of the present invention is that the ash content in the hydrolyzed ethylene-vinyl acetate copolymer is not more than 20 ppm and the alkali metal content in the hydrolyzed copolymer is not more than 5 ppm. That is, usually, the hydrolyzed copolymer is prepared by hydrolyzing an ethylene-vinyl acetate copolymer with an alkaline catalyst. After hydrolysis reaction, polyvalent metal salt contained in industrial water or reagents as impurities and alkali metal hydroxides used as a hydrolysis catalyst remain in the reaction system as an acetate of alkali metal, and the alkali metal acetate is contained in the hydrolyzed copolymer precipitated from the hydrolyzing liquid. In the present invention, the water resistance of the hydrolyzed copolymer is improved by removing the metal salts from the hydrolyzed copolymer as much as possible. Moreover, the electric property, the color and the heat resistance can be improved by making the amount remaining of the metal salt small.

The term "ash" used herein means a residue obtained by placing the hydrolyzed ethylene-vinyl acetate copolymer dried on a platinum evaporating dish, carbonizing it by using a heater and a gas burner, placing the carbonized hydrolyed copolymer in an electric furnace having a temperature of 400° C., gradually elevating the temperature of the furnace to 700° C., completely laying the carbonized copolymer in ashes by heating at 700° C. for 3 hours, allowing the resulting ash of copolymer to cool for 5 minutes after taking out from the furnace, and allowing it to stand for 25 minutes in a desiccator. The amount of the thus obtained ashes are accurately determined and it shows as an ash content. In the present invention, it is necessary that the ash content is not more than 20 ppm, and it is preferable that the content is not more than 10 ppm. When the ash content is more than 20 ppm, the properties of the hydrolyzed copolymer are largely changed depending on the change of humidity. Generally, the hydrolyzed copolymer of the invention has the ash content of 1 to 20 ppm.

In the present invention, it is necessary that the alkali metal content is not more than 5 ppm, and it is preferable the content is not more than 3 ppm. When the alkali metal content is more than 5 ppm, in case of blending the hydrolyzed copolymer with other materials or adhering the copolymer to other materials, the hydrolyzed copolymer deteriorates the other materials. Generally, the hydrolyzed copolymer of the invention has the alkali metal content of 0.5 to 5 ppm. The alkali metal content is determined according to atomic absorption analysis of an aqueous hydrochloric acid solution of the ashes, the solution being obtained by dissolving the ashes obtained in the same manner as above in an aqueous solution of hydrochloric acid with heating.

In the present invention, the powder, particules or pellets (hereinafter referred to as "the powder and the like") of the hydrolyzed ethylene-vinyl acetate copolymer are thoroughly washed with an aqueous solution of an acid, preferably a weak acid, to remove the salts which causes to generation of the ashes and the alkali metal from the hydrolyzed copolymer. Then, it is desirable that the powder and the like washed with the aqueous solution of the acid are further washed with water to remove the acid adhered to the powder and the like. Thus, the hydrolyzed copolymer of the present invention can be obtained by washing the hydrolyzed copolymer with the aqueous solution of the acid, and, desirably, further washing the copolymer with water, and drying.

Examples of the acids are, for instance, acetic acid, propionic acid, glycollic acid, lactic acid, adipic acid, azelaic acid, glutaric acid, succinic acid, benzoic acid, isophthalic acid, terephthalic acid, and the like. An acid having a pKa (25° C.) of not less than 3.5 is preferably used.

After completing the above mentioned acid treatment, the hydrolyzed copolymer is further treated with an aqueous solution of a strong acid after, or before washing with water. The washing with a dilute aqueous solution of the strong acid is prefered, since it is possible to efficiently remove the alkali metal. Examples of the strong acids are, for instance, an organic acid having a pKa (25° C.) of not more than 2.5 such as oxalic acid or maleic acid, an inorganic acid such as phosphoric acid, sulfuric acid, nitric acid or hydrochloric acid, and the like.

The hydrolyzed ethylene-vinyl acetate copolymer used in the present invention has an ethylene content of 20 to 60% by mole, preferably 25 to 55% by mole, and has a degree of hydrolysis in the vinyl acetate component of at least 95% by mole. When the ethylene content is below 20% by mole, the oxygen impermeability is lowered at high humidity, on the other hand, when the ethylene content is over 60% by mole, the properties such as the oxygen impermeability and the printablility are lowered. When the degree of hydrolysis is below 95% by mole, the oxygen impermeability and the moisture resistance are lowered.

The hydrolyzed copolymer used in the invention may include a small amount of comonomers, e.g. α-olefins such as propylene, iso-butene, α-octene, α-dodecene and α-octadecene; an unsaturated carboxylic acids, their salts, partial or complete alkyl esters, nitriles, amides and anhydrides; and unsaturated sulfonic acid and their salts.

Thus, the desired hydrolyzed ethylene-vinyl acetate copolymer can be prepared, and is useful for various uses such as molded articles, adhesives and coatings. Particularly, the hydrolyzed copolymer is widely used as molded articles, and is formed into molded articles having any shape such as pellet, film, sheet, container, fiber, bar or tube by melt molding. Also, the pulverized articles (in case of recycling of used articles) or pellets may be further subjected to the melt molding. The obtained film or sheet can be uniaxially or biaxially stretched. As a molding method, an extrusion such as T die extrusion, tubular film process, blow molding, melt spinning or profile extrusion and injection molding are mainly applicable to molding of the hydrolyzed copolymer. The melt temperature is often selected from the range of 170° C. to 270° C. The above-mentioned injection molding includes two-color molding and injection blow molding, and the obtained molded articles have high dimensional precision.

Also, there can be molded a mixture of two or more kinds of the hydrolyzed ethylene-vinyl acetate copolymers different from each other in an ethylene content or a degree of hydrolysis. When the hydrolyzed copolymer is subjected to melt-molding, usual additives can be admixed in a suitable amount to the hydrolyzed copolymer. Examples of the additives are, for instance, plasticizers such as polyhydric alcohol, stabilizers, surfactants, cross-linkable substances such as epoxy compounds, polyvalent metal salts and organic or inorganic polybasic acids and their salts, fillers, coloring agents, fibers used as reinforcement (glass fibers, carbon fibers, and the like), and the like. Also, other thermoplastic resins may be admixed in a suitable amount to the hydrolyzed copolymer. Examples of the other thermoplastic resins are, for instance, polyolefins such as polyethylene, polypropylene, ethylene-propylene copolymer, ethylene-propylene-diene terpolymer, a copolymer of ethylene and an α-olefin having not less than 4 carbon atoms, ethylene-vinyl acetate copolymer, ethylene-acrylic acid ester copolymer, ionomer, polybutene and polypentene; their modified polyolefin prepared by graft-modification of the above-mentioned polyolefin with the unsaturated carboxylic acid or derivative thereof; polyamide, polyvinyl chloride, polyvinylidene chloride, polyester, polystyrene, polyacrylonitrile, polyurethane, polycarbonate, polyvinyl alcohol resin capable of melt-molding, and the like.

When the extrusion is adopted as the melt kneading method, not only the extrusion in which the hydrolyzed ethylene-vinyl acetate copolymer is employed alone can be carried out, but also there can be carried out the coextrusion in which the hydrolyzed copolymer and other thermoplastic resins are melt kneaded separately and they are extruded so as to join at the inside or the outside of a die or a combining adaptor. Also, the composition having the hydrolyzed copolymer of the invention can be extrusion-coated on a base material such as plastic film, metal foil or paper. As the other thermoplastic resin used in the coextrusion, the above-mentioned thermoplastic resins can be employed. Examples of the base material in the extrusion-coating are, for instance, films, sheets or laminated films of cellophane, polypropylene, polyamide, polyester, polycarbonate, polystyrene or polyvinyl chloride (they may be uniaxially or biaxially stretched, or both or either of their sides are coated with polyvinylidene chloride resin, and the like), and the like. The thus obtained films, sheets and containers are useful as wrapping or packaging materials for foods, medical supplies, industrial chemical reagents, agricultural chemicals, and the like.

The hydrolyzed copolymer of the present invention can give films whose gas impermeability is not lowered even under high humidity by decreasing the ash content and the alkali metal content in the hydrolyzed copolymer.

The present invention is more specifically described and explained by means of the following Examples in which all per cents and parts are by weight unless otherwise noted. It is to be understood that the present invention is not limited to the Examples, and various changes and modifications may be made in the invention without departing from the spirit and scope thereof.

EXAMPLE 1

A pressure reactor was charged with 1,000 parts of a 40% methanol solution of ethylene-vinyl acetate copolymer having an ethylene content of 40% by mole and heated to 110° C. with stirring. Then, the hydrolysis reaction was carried out for 2.5 hours by continuously adding 40 parts of a 6% methanol solution of sodium hydroxide and 2,500 parts of methanol to the pressure reactor with removing methyl acetate produced as a by-product and excess methanol from the reaction system to give a hydrolyzed ethylene-vinyl acetate copolymer having a degree of hydrolysis in vinyl acetate component of 99.0% by mole.

After completing the hydrolysis reaction, the pressure reactor was charged with 450 parts of a mixture of methanol and water (methanol:water=7:3) under distilling away excess methanol, and methanol solution containing water (water:methanol=3:7) having a resin content of 39% was prepared.

The obtained solution of the hydrolyzed ethylene-vinyl acetate copolymer in the mixture of methanol and water having a temperature of 50° C. was extruded through a nozzle (hole diameter: 4 mm) at a rate of 1.5 litrs/hour into a coagulating bath having a mixture of water and methanol (water:methanol=9:1) (width: 100 mm, length: 4,000 mm, height: 100 mm) maintained at a temperature of 5° C. in the form of strand. After completing the coagulation, the strand was passed through a wind-up roller (line speed: 2 m/minute) equipped at the end portion of the coagulating bath, was cut by a cutter to prepare white porous pellets having a diameter of 4 mm and a length of 4 mm. The hydrolyzed ethylene-vinyl acetate copolymer had an ash content of 7,400 ppm and a sodium metal content of 4,800 ppm.

Then, 100 parts of the obtained pellets were washed by dipping in 300 parts of a 0.3% aqueous sodution of acetic acid and stirring at 30° C. for 1 hour. After repeating the above washing twice, the slurry was filtered off. The obtained pellets were washed by mixing with 300 parts of water to give a slurry and stirring the slurry at 30° C. for 1 hour. After repeating the washing three times, the slurry was filtered off and dried.

Thus obtained hydrolzed ethylene-vinyl acetate copolymer had a degree of hydrolysis of 99.0% by mole, an ash content of 6 ppm and a sodium metal content of 2.7 ppm. The hydrolyzed copolymer was extruded at 230° C. to give a film having a thickness of 20 $\mu$.

Oxygen permeability (cc.cm/cm$^2$.sec.cmHg) of the obtained film was measured by ASTM D1434-58. Also, the number of fish eyes (diameter: at least 0.1 mm) per area of 100 cm$^2$ of the film was counted.

The hydrolyzed copolymer as obtained above was pelletized by using an extruder at 230° C. The pelletization was repeated three times. A film was prepared in the same manner as above from the obtained pellets given a heat history for a long time. The number of the fish eyes in the film was counted in the same manner as above. The results are shown in Table 1.

The ash content and sodium metal content were determined as follows:

Ash content

There is exactly determined about 80 g of a dried sample of the hydrolyzed copolymer, and about 10 g of the sample is placed on a platinum evaporating dish reached to constant weight and carbonized by using an electric heater. After carbonizing 10 g of the sample, 10 g of the other sample is placed on the evaporating dish and carbonized in the same manner as above. The above procedure is repeated until all of the sample is carbonized. At last the sample on the dish is burned by heating with a gas burner until not giving out smoke. The evaporating dish is put into an electric furnace having a temperature of about 400° C., covered nearly all the dish with a cover of a porcelain crucible and the temperature of the furnace is gradually risen to 700° C. After completing the ashing by maintaining the temperature at 700° C. for 3 hours, the dish is taken out from the electric furnace. The dish is allowed to cool for 5 minutes and is allowed to stand in a desiccator for 25 minutes. The obtained ashes are exactly determined.

Sodium metal content

There is exactly determined about 10 g of a dried sample of the hydrolyzed copolymer and is charged in a platinum crucible. The ashing is conducted in the same manner as above. The platinum crucible is charged with 2 ml of guaranteed hydrochloric acid (which is prescribed in Japanese Industrial Standard) and 3 ml of pure water and the ashes are dissolved by heating with an electric heater. The obtained solution is poured into a 50 ml messflask with pure water and pure water is added to the flask to its indicator to prepare a sample for atomic absorption analysis.

A standard solution for atomic absorption analysis (sodium metal: 1 ppm, hydrochloric acid : about 0.5N) is separately prepared. Sodium metal content is determined by measurement of an absorbance ratio of an absorbance of sample solution to an absorbance of standard solution. Measuring conditions are as follows:

Apparatus
Hitachi 180-30 atomic absorption / flame spectrophotometer commercialy available from Hitachi, Ltd..
Wave length:
589.0 nm
Flame:
acetylene-air

COMPARATIVE EXAMPLE 1

A film was prepared in the same manner as in Example 1 except that a hydrolyzed ethylene-vinyl acetate copolymer having an ash content of 30 ppm and a sodium metal content of 10 ppm was used. The oxygen permeability and the number of fish eyes were measued in the same manner as in Example 1. The results are shown in Table 1.

TABLE 1

| | Oxygen Permeability (cc · cm/cm$^2$ · sec · cmHg) | | | The number of fish eyes | |
|---|---|---|---|---|---|
| | 0% RH (20° C.) | 80% RH (20° C.) | 95% RH (20° C.) | After pelletizing one time | After pelletizing three times |
| Ex. 1 | $4.0 \times 10^{-14}$ | $5.6 \times 10^{-14}$ | $6.2 \times 10^{-14}$ | 1 to 2 | 3 to 4 |
| Com. Ex. 1 | $4.0 \times 10^{-14}$ | $8.3 \times 10^{-14}$ | $24.1 \times 10^{-14}$ | 10 to 15 | 30 to 40 |

EXAMPLES 2 TO 4

A film was prepared in the same manner as in Example 1 except that a hydrolyzed ethylene-vinyl acetate copolymer shown in Table 2 was used. The oxygen permeability was measured in the same manner as in Example 1. The results are shown in Table 2.

TABLE 2

| | Hydrolyzed ethylene-vinyl acetate copolymer | | | | Oxygen permeability (cc · cm/cm$^2$ · sec · cmHg) | | |
|---|---|---|---|---|---|---|---|
| Ex. | Ethylene content | Degree of hydrolysis (% by mole) | Ash content (ppm) | Sodium metal content (ppm) | 0% RH (20° C.) | 80% RH (20° C.) | 95% RH (20° C.) |
| 2 | 29.5 | 99.5 | 6 | 2.5 | $0.9 \times 10^{-14}$ | $1.9 \times 10^{-14}$ | $2.2 \times 10^{-14}$ |
| 3 | 29.5 | 99.5 | 10 | 3.0 | $0.9 \times 10^{-14}$ | $2.3 \times 10^{-14}$ | $3.3 \times 10^{-14}$ |

TABLE 2-continued

| | Hydrolyzed ethylene-vinyl acetate copolymer | | | | Oxygen permeability (cc · cm/cm² · sec · cmHg) | | |
|---|---|---|---|---|---|---|---|
| Ex. | Ethylene content | Degree of hydrolysis (% by mole) | Ash content (ppm) | Sodium metal content (ppm) | 0% RH (20° C.) | 80% RH (20° C.) | 95% RH (20° C.) |
| 4 | 40 | 99.5 | 10 | 4.5 | $4.0 \times 10^{-14}$ | $6.7 \times 10^{-14}$ | $9.3 \times 10^{-14}$ |

EXAMPLE 5

The procedure of Example 1 was repeated except that, before washing with water, pellets were washed by dipping in 230 parts of a 0.03% aqueous solution of phosphoric acid and stirring at 30° C. for 1 hour to give pellets of hydrolyzed copolymer. The obtained hydrolyzed ethylene-vinyl acetate copolymer had an ash content of 10 ppm and a sodium metal content of 1.4 ppm. The film was prepared in the same manner as in Example 1 and the oxygen permeability and the number of fish eyes were measured in the same manner as in Example 1. The results are shown in Table 3.

TABLE 3

| Oxygen permeability (cc · cm/cm² · sec · cmHg) | | | The number of fish eyes | |
|---|---|---|---|---|
| 0% RH (20° C.) | 80% RH (20° C.) | 95% RH (20° C.) | After pelletizing one time | After pelletizing three times |
| $4.0 \times 10^{-14}$ | $5.1 \times 10^{-14}$ | $5.8 \times 10^{-14}$ | 1 to 2 | 3 to 4 |

As shown above, the films prepared from the hydrolyzed copolymer of the invention are extremely excellent in the oxygen impermeability under high humidity.

In addition to the ingredients used in the Examples, other ingredients can be used in the Examples as set forth in the specification to obtain substantially the same results.

What we claim is:

1. A hydrolyzed ethylene-vinyl acetate copolymer having an ethylene content of 20 to 60% by mole and a degree of hydrolysis in the vinyl acetate component of at least 95% by mole, and having an ash content of not more than 20 ppm and an alkali metal content of not more than 5 ppm.

2. The copolymer of claim 1, wherein said ash content is not more than 10 ppm.

3. The copolymer of claim 1, wherein said alkali metal content is not more than 3 ppm.

* * * * *